(12) United States Patent
Lysobey et al.

(10) Patent No.: US 7,927,047 B2
(45) Date of Patent: Apr. 19, 2011

(54) MULTI-CARTRIDGE CUTTING TOOL

(75) Inventors: Paul William Lysobey, Walton Hills, OH (US); Dan Elwyn Chesney, Colorado Springs, CO (US)

(73) Assignee: Kennametal Inc., Latrobe, PA (US)

( * ) Notice: Subject to any disclaimer, the term of this patent is extended or adjusted under 35 U.S.C. 154(b) by 357 days.

(21) Appl. No.: 12/101,172

(22) Filed: Apr. 11, 2008

(65) Prior Publication Data

US 2009/0257834 A1 Oct. 15, 2009

(51) Int. Cl.
*B23B 51/00* (2006.01)
(52) U.S. Cl. ............ 408/1 R; 408/223; 408/224; 407/30
(58) Field of Classification Search .................. 408/1 R, 408/223, 224; 407/30, 31, 35–39
See application file for complete search history.

(56) References Cited

U.S. PATENT DOCUMENTS

| | | | | |
|---|---|---|---|---|
| 1,418,485 A * | 6/1922 | Smith | | 408/224 |
| 2,630,725 A * | 3/1953 | Black | | 408/224 |
| 3,593,461 A * | 7/1971 | Gay | | 451/209 |
| 4,050,840 A | 9/1977 | Skingle | | |
| 4,093,392 A * | 6/1978 | Hopkins | | 407/48 |
| 4,211,129 A * | 7/1980 | Wittkopp et al. | | 82/1.11 |
| 4,519,731 A * | 5/1985 | Jester et al. | | 407/46 |
| 4,552,491 A * | 11/1985 | Parker | | 407/107 |
| 5,209,021 A | 5/1993 | Christie et al. | | |
| 5,597,268 A * | 1/1997 | Izumi | | 407/51 |
| 5,658,100 A | 8/1997 | Deiss et al. | | |
| 5,967,712 A | 10/1999 | Magill et al. | | |
| 2005/0019118 A1 | 1/2005 | Elbaz et al. | | |
| 2008/0175682 A1 * | 7/2008 | Musil et al. | | 408/153 |
| 2009/0129879 A1 * | 5/2009 | Sadaoka et al. | | 408/1 R |
| 2009/0257835 A1 * | 10/2009 | Lysobey et al. | | 407/73 |
| 2010/0014929 A1 * | 1/2010 | Stojanovski | | 407/54 |

FOREIGN PATENT DOCUMENTS

| | | | |
|---|---|---|---|
| DE | 2751475 A * | 5/1979 | |
| DE | 3429022 A * | 2/1986 | |
| JP | 57-100419 | 6/1982 | |
| JP | 2005-246527 | 9/2005 | |
| SU | 1750918 A1 * | 7/1992 | |

OTHER PUBLICATIONS

Intl. Search Report for PCT/US2008/082428 English Abstract.

* cited by examiner

*Primary Examiner* — Boyer D Ashley
*Assistant Examiner* — Sara Addisu
(74) *Attorney, Agent, or Firm* — Larry R. Meenan

(57) ABSTRACT

A multi-cartridge cutting tool includes a body with a plurality of cartridge-receiving pockets, and a plurality of insert-receiving cartridges mounted to a respective pocket. A round cutting insert is mounted to each cartridge. The pockets are formed at predetermined distances from a central, longitudinal axis of the body to form a first group and a second group of cutting inserts such that the cutting edges of the first group of cutting inserts and the cutting edges of the second group of cutting inserts are located at different axial and radial distances from the central, longitudinal axis of the body to perform different machining operations.

18 Claims, 5 Drawing Sheets

MULTI-CARTRIDGE CUTTING TOOL

BACKGROUND OF THE INVENTION

Cutting tools with round cutting inserts, such as milling cutters, boring bars, and the like, may often manage a number of profiling operations from fine machining to rough machining. Usually, the round cutting inserts generate a fine surface at a particular feed rate because the round edge functions as a wiper. Currently, cutting tools include four round cutting inserts mounted onto the cutter body with two cutting inserts performing a rough cutting operation and the other two cutting insets performing a finish cutting operation. However, it has been observed with cutting tools having four round cutting inserts that the feed rates and the life of the cutting inserts are deficient for some machining applications and some particular materials to be machined. Thus, there is a need to provide a cutting tool that is capable of higher feed rates, while maximizing the life of the cutting insert.

BRIEF SUMMARY OF THE INVENTION

Briefly, according to an aspect of the invention, there is provided a multi-cartridge cutting tool comprising a body including at least five cartridge-receiving pockets, each cartridge-receiving pocket including a pair of side walls, a bottom wall and a back wall. The back wall of the cartridge-receiving pockets is located at a plurality of different radial distances, and the bottom wall of the cartridge-receiving pockets is located at a plurality of different axial distances. An insert-receiving cartridge is adapted to be mounted to a respective cartridge-receiving pocket. A cutting insert is adapted to be mounted to a respective insert-receiving cartridge. A first group of cutting inserts comprises one-half of the cutting inserts adjacent to each other, and a second group of cutting inserts comprises the other one-half of the cutting inserts located diagonally opposite the first group. The cutting edges of the first group and the cutting edges of the second group are located at different axial and radial distances from a central, longitudinal axis of the body to perform different machining operations.

According to another aspect of the invention, there is provided a multi-cartridge cutting tool comprising a body including eight cartridge-receiving pockets, each cartridge-receiving pocket including a pair of side walls, a bottom wall and a back wall. The back wall of the cartridge-receiving pockets is located at four different radial distances, and the bottom wall of the cartridge-receiving pockets is located at four different axial distances. An insert-receiving cartridge is adapted to be mounted to a respective cartridge-receiving pocket, and a cutting insert is adapted to be mounted to a respective insert-receiving cartridge. The cutting edges of four of the cutting inserts are located at four different axial and radial distances from a central, longitudinal axis of the body to perform finish machining, semi-finish machining, semi-rough machining and rough machining of a workpiece.

According to yet another aspect of the invention, a method of manufacturing a multi-cartridge cutting tool having a body comprises the steps of:

forming the body with at least five cartridge-receiving pockets, each cartridge-receiving pocket including a pair of side walls, a bottom wall and a back wall; the back wall of the cartridge-receiving pockets being located at a plurality of different radial distances, and the bottom wall of the cartridge-receiving pockets being located at a plurality of different axial distances;

mounting an insert-receiving cartridge to a respective cartridge-receiving pocket;

mounting a cutting insert with a cutting edge to a respective insert-receiving cartridge, whereby a first group of cutting inserts comprises one-half of the cutting inserts adjacent to each other, and a second group of cutting inserts comprises the other one-half of the cutting inserts located diagonally opposite the first group, and whereby the cutting edges of the first group of cutting inserts and the cutting edges of the second group of cutting inserts are located at different axial and radial distances from a central, longitudinal axis of the body to perform different machining operations.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

According to the principles of the invention, a cutting tool includes a body with an even number of cartridge-receiving pockets greater than four pockets, for example, six, eight, ten, twelve, and the like, proximate a cutting end of the body. It is possible that the cutting tool may have an odd number of pockets greater than four pockets, such as five, seven, nine, eleven, and the like. The pockets are spaced circumferentially equidistant with respect to each other. Each cartridge-receiving pocket including a pair of side walls, a bottom wall and a back wall. The back wall of the cartridge-receiving pockets is located at a plurality of different radial distances, and the bottom wall of the cartridge-receiving pockets is located at a plurality of different axial distances. An insert-receiving cartridge is adapted to be mounted to a respective cartridge-receiving pocket. A cutting insert is adapted to be mounted to a respective insert-receiving cartridge. A first group of cutting inserts comprises one-half of the cutting inserts adjacent to each other, and a second group of cutting inserts comprises the other one-half of the cutting inserts located diagonally opposite the first group. For cutting tools with an odd number of cutting inserts, a third group comprising a single cutting insert would be located between the first and second groups. The cutting edges of a first group and the second group are located at different axial and radial distances from a central, longitudinal axis of the body to perform different machining operations, such as a finish machining operation, semi-finish machining operation, semi-rough machining operation, rough machining operation, and the like. For cutting tools with an odd number of cutting inserts, the third group could perform the same machining operations as one of the cutting inserts of the first and second groups, or a different machining operation.

Figure 3:
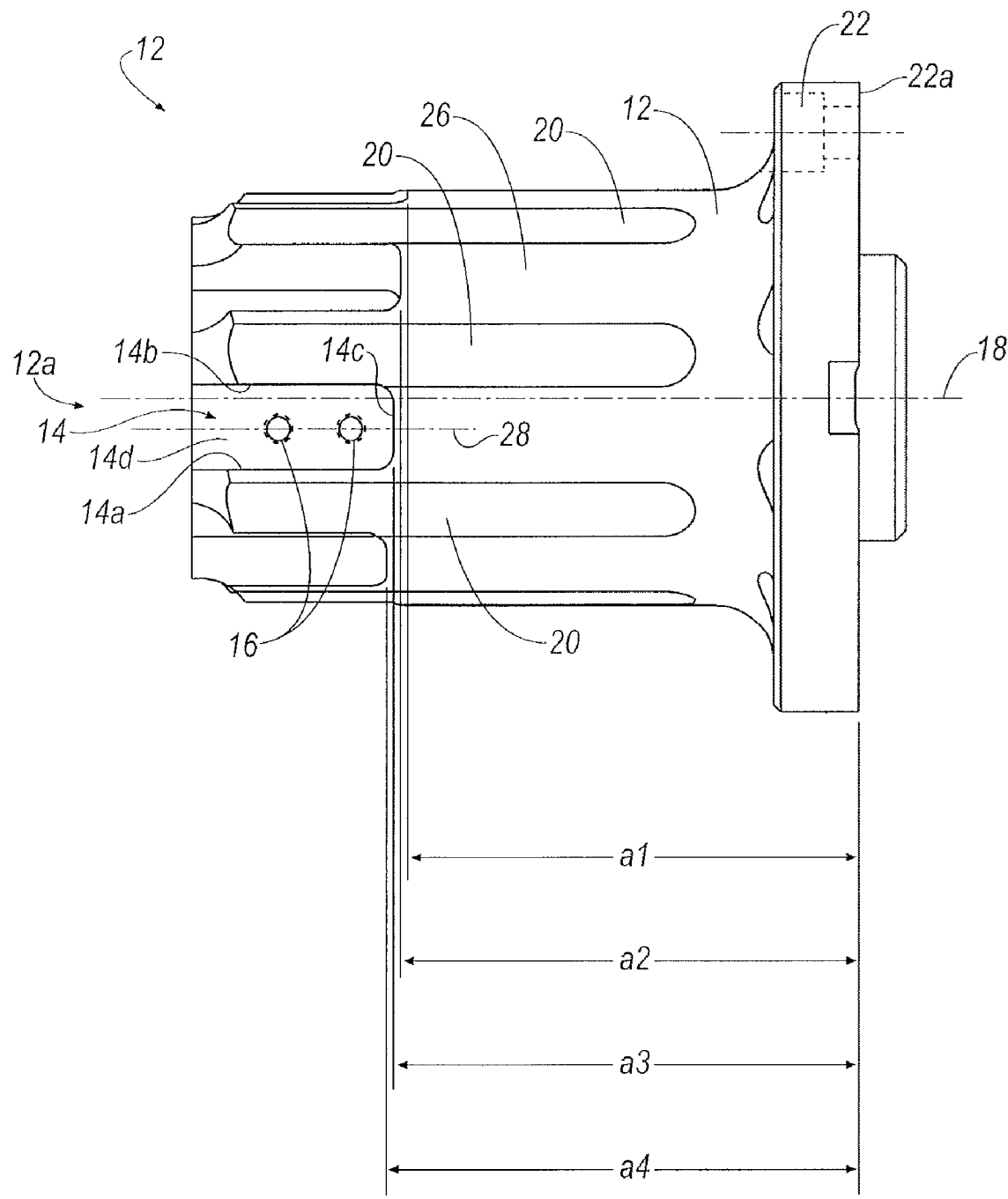
FIG. 3 is a side view of a body of the multi-cartridge cutting tool of FIG. 1 without cutting inserts mounted thereto.

In an embodiment that is illustrated in FIGS. 1-5, the cutting tool 10 comprises a boring bar having a body 12 with eight cartridge-receiving pockets 14 that are equidistantly spaced at about forty-five (360/8=45) degrees with respect to each other and proximate a cutting end 12a of the body 12. Each cartridge-receiving pocket 14 includes a pair of opposing side walls 14a, 14b, a bottom wall 14c and a back wall 14d. As shown in FIG. 3, a longitudinal axis 28 of each pocket 14 is substantially parallel with a central, longitudinal axis 18 of the body 12. A pair of threaded apertures 16 is formed so as to radially extend from the back wall 14d of each pocket 14 toward the central, longitudinal axis 18 of the body 12. In the illustrated embodiment, the threaded apertures 16 are aligned along the longitudinal axis 28 of the cartridge-receiving pocket 14. A longitudinally-extending flute 20 is formed proximate to each cartridge-receiving pocket 14 to provide effective chip control. In the illustrated embodiment, each flute 20 has a concave-shaped or dish-shaped profile with respect to the outer surface of the body 12. The body 12 includes a flange member 22 distal from the cutting end 12a for mounting the cutting tool 10 to a spindle of a cutting machine (not shown). The flange member 22 includes a plurality of mounting bores 24 for enabling the cutting tool 10 to be mounted to the spindle. In the illustrated embodiment, the cutting tool 10 has a total of ten mounting bores 24. However, the invention is not limited by the number of mounting bores, and can be practiced with any desirable number of mounting bores that will be sufficient to mount the cutting tool 10 to cutting machine.

Figure 4:
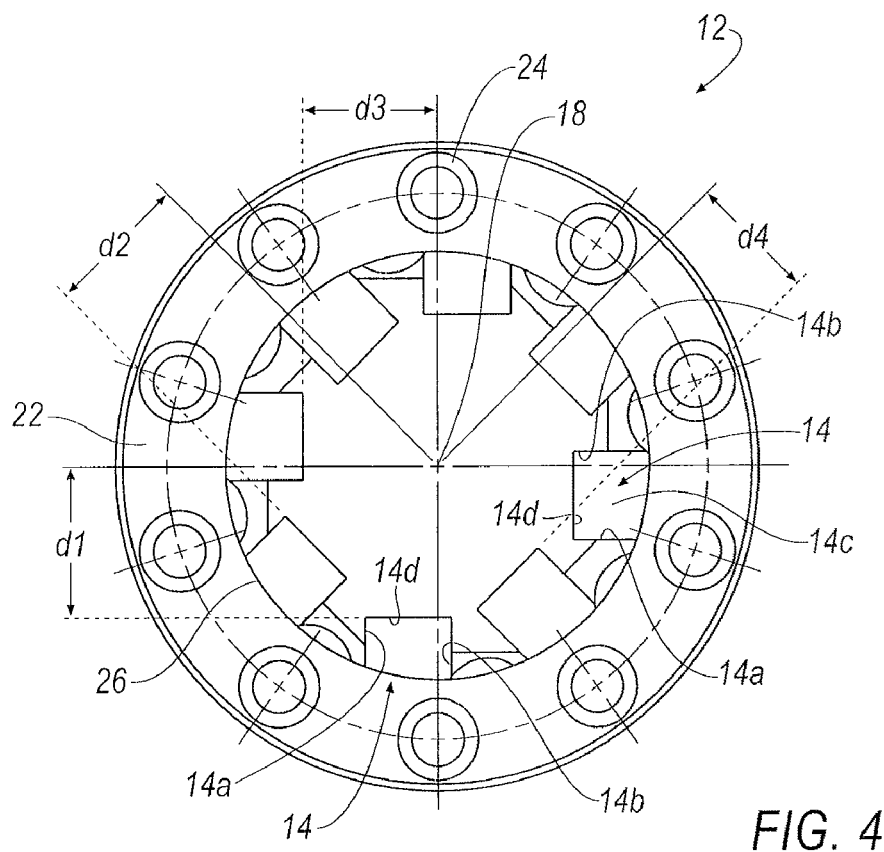
FIG. 4 is a front view of the body of the multi-cartridge cutting tool of FIG. 3.
Figure 5:
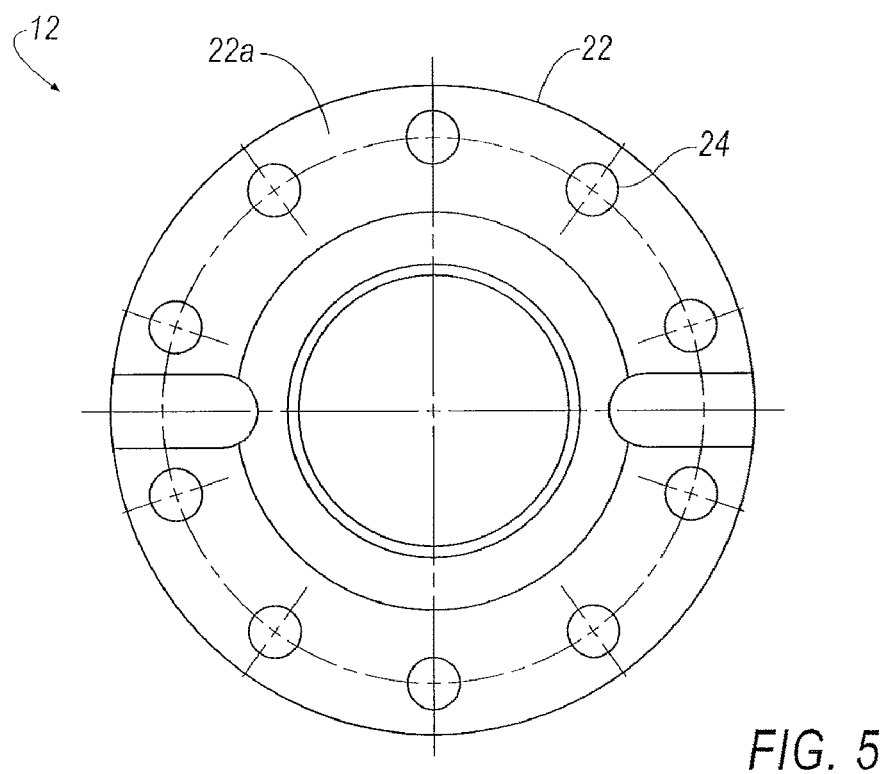
FIG. 5 is a rear view of the body of the multi-cartridge cutting tool of FIG. 3.
Figure 6:
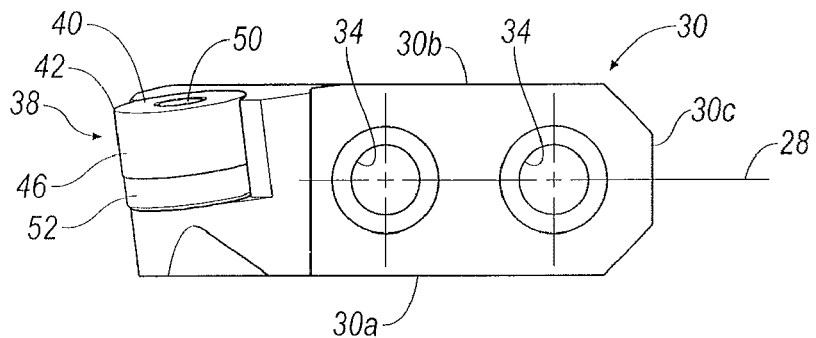
FIG. 6 is a side view of the insert-receiving cartridge of FIG. 1 according to an embodiment of the invention.
Figure 7:
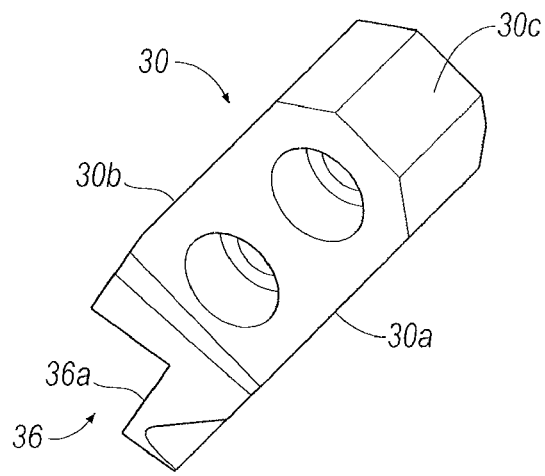
FIG. 7 is a side perspective view of the insert-receiving cartridge of FIG. 1.
Figure 8:
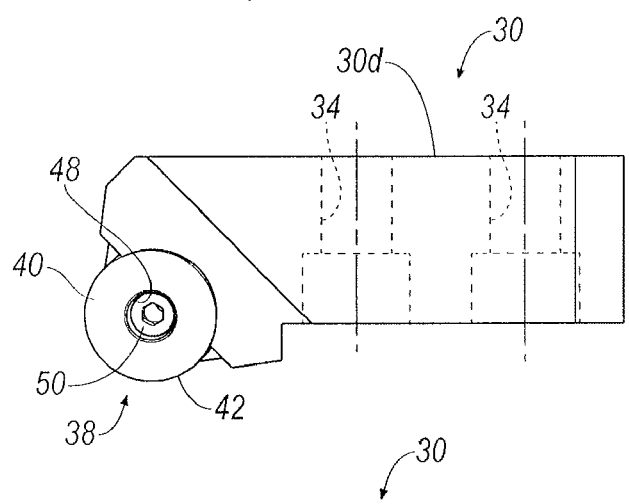
FIG. 8 is a top view of the insert-receiving cartridge of FIG. 1.
Figure 9:
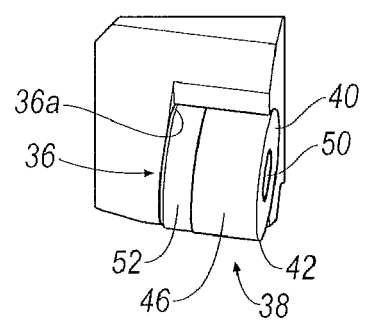
FIG. 9 is an end view of the insert-receiving cartridge of FIG. 1.

As shown in FIG. 4, the back wall 14d of four adjacent cartridge-receiving pockets 14 of the eight pockets 14 forming a first group is located from the central, longitudinal axis 18 of the body 12 by radial distances d1, d2, d3 and d4, respectively. In the illustrated embodiment, the radial distance d1 is larger than the radial distance d2, the radial distance d2 is larger than the radial distance d3, and the radial distance d3 is larger than the radial distance d4. The back wall 14d of the other four adjacent cartridge-receiving pockets 14 forming a second group are also located at the four different radial distances d1, d2, d3 and d4, respectively. As a result, the back wall 14d of two cartridge-receiving pockets 14 in the first and second group located directly opposite each other are at approximately the same radial distance from the central, longitudinal axis 18 of the body 12. It is noted that the side walls 14a and 14b of each pocket 14 have a different depth from the outer surface 26 of the body 12 because each cartridge-receiving pocket 14 is not radially aligned with the central, longitudinal axis 18 of the body 12.

In addition to the back wall 14d of the cartridge-receiving pockets 14 of the first group are located at four different radial distances d1, d2, d3 and d4 with respect to the central, longitudinal axis 18 of the body 12, and the bottom wall 14c of the cartridge-receiving pockets 14 of the first group are located at four different axial distances a1, a2, a3 and a4 from an end face 22a of the flange member 22 of the body 12. Specifically, the bottom wall 14c of four adjacent cartridge-receiving pockets 14 in the first group are located at four different distances a1, a2, a3 and a4 with respect to an end face 22a of the flange member 22 of the body 12, as shown in FIG. 3. Similarly, the other four adjacent cartridge-receiving pockets 14 in the second group are also located at the four different axial distances a1, a2, a3 and a4. As a result, the bottom wall 14c of two cartridge-receiving pockets 14 of the first and second groups located directly opposite each other are at approximately the same axial distance from the end face 22a of the flange member 22 of the body 12.

Referring now to FIGS. 6-9, the cutting tool 10 also includes a plurality of insert-receiving cartridges 30 adapted to be received in the cartridge-receiving pockets 14 of the body 12. In the illustrated embodiment, each cartridge 30 is substantially identical to each other. Each cartridge 30 is mounted to its respective pocket 14 by a pair of mounting screws 33 (FIG. 1) that are inserted through apertures 34 in the cartridge 30 and threadingly received in the threaded apertures 16 of the body 12. In the illustrated embodiment, the apertures 34 are substantially aligned along the longitudinal axis 28 of the cartridge-receiving pocket 14, similar to the threaded apertures 16 of the body 12. Each cartridge 30 includes a pair of substantially parallel side walls 30a, 30b, a bottom wall 30c and a back wall 30d. When mounted in the cartridge-receiving pocket 14 of the body 12, the side walls 30a, 30b of the cartridge 30 contact the side walls 14a, 14b of the pocket 14, the bottom wall 30c of the cartridge 30 contacts the bottom wall 14c of the pocket 14, and the back wall 30d of the cartridge 30 contacts the back wall 14d of the pocket to securely hold the cartridge 30 in place.

Figure 1:
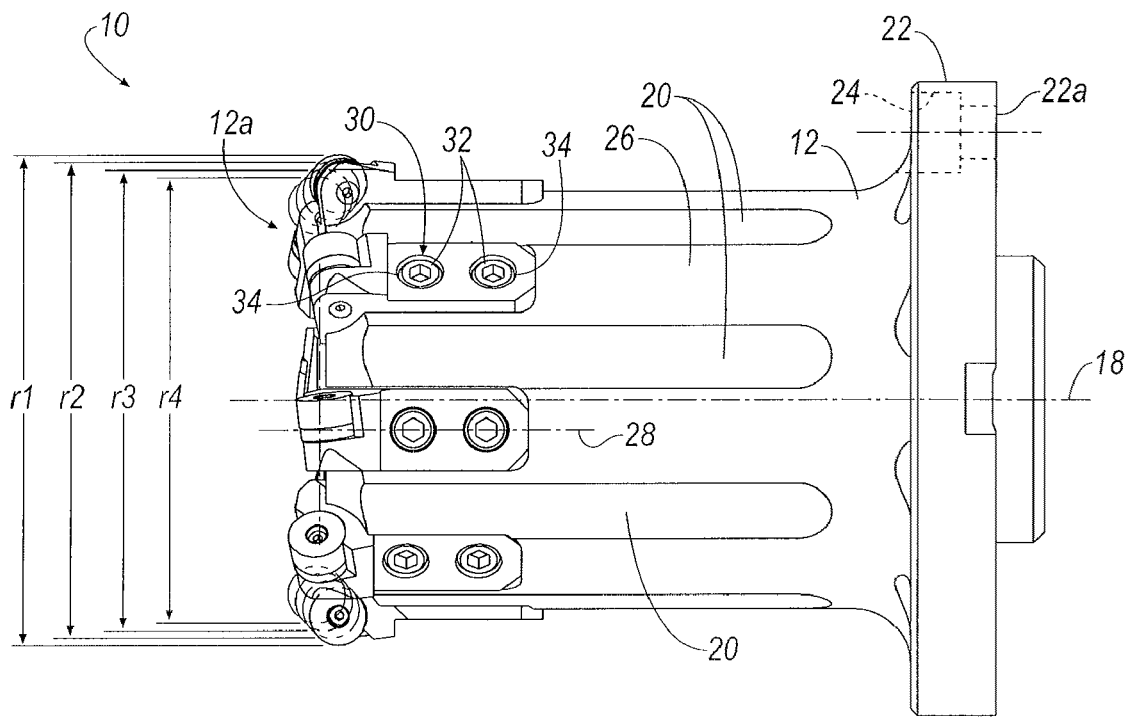
FIG. 1 is a side view of a multi-cartridge cutting tool with a plurality of cartridge-receiving pockets and corresponding number of insert-receiving cartridges with cutting inserts mounted thereto according to an embodiment of the invention.
Figure 2:
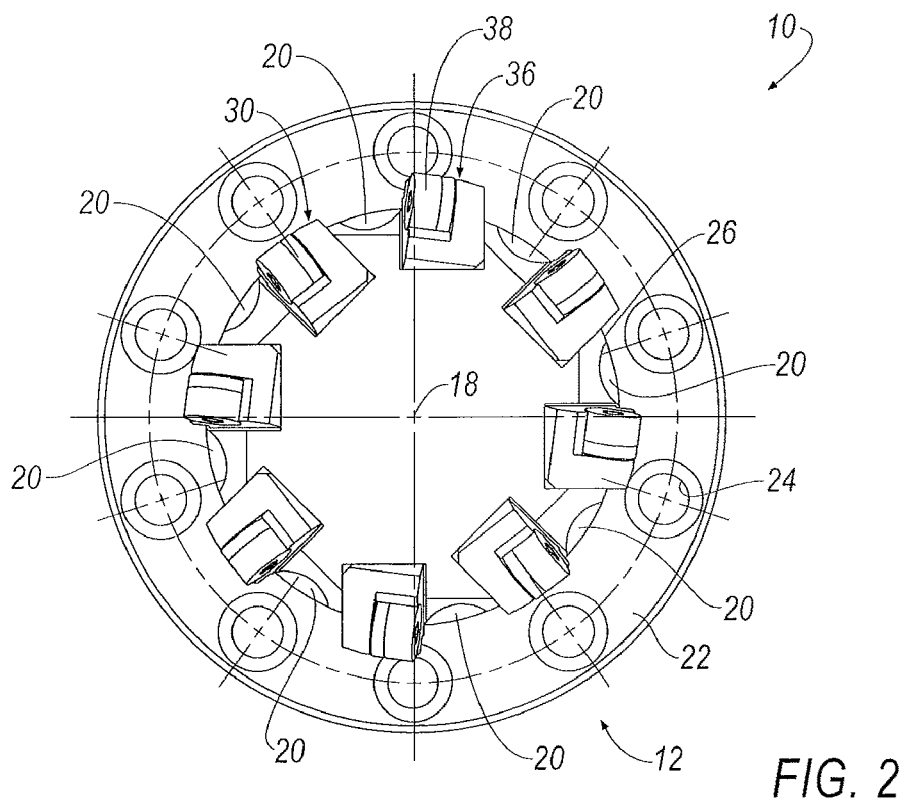
FIG. 2 is a front view of the multi-cartridge cutting tool of FIG. 1.
Figure 10:
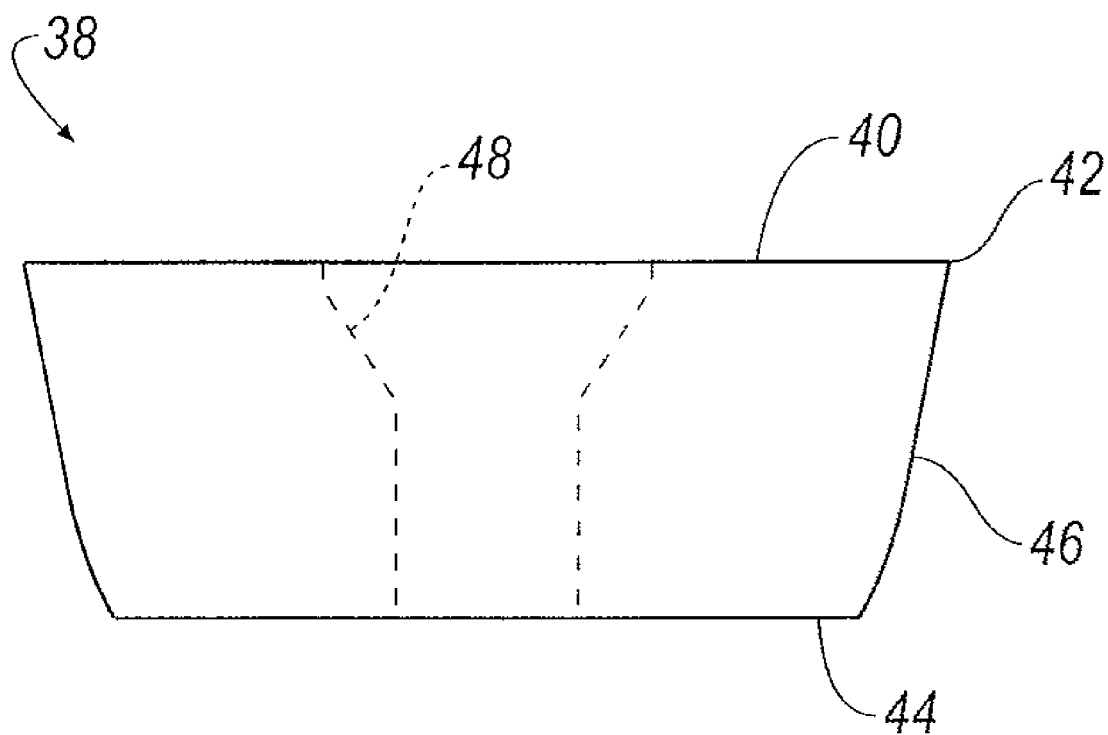
FIG. 10 is a side view of a cutting insert that is mounted to the insert-receiving cartridge of FIG. 1 according to an embodiment of the invention.

Each insert-receiving cartridge 30 includes an insert-receiving pocket 36 adapted to have a cutting insert 38 mounted thereto. As shown in FIG. 10, the cutting insert 38 is a conventional round cutting insert having an upper surface 40 that terminates in a circular cutting edge 42, and a bottom surface 44 that engages a bottom wall 36a (FIG. 7) of the pocket 36 when the insert 38 is mounted to the pocket 36. The insert 38 also includes a frusto-conical side wall 46 interconnecting the upper surface 40 and the bottom surface 44. A screw hole 48 (shown in phantom) is centrally disposed through the body of the insert 38 for receiving a threaded clamping screw 50 (FIG. 1). An optional shim 52 may be positioned between the bottom wall 36a of the pocket 36 and the cutting insert 38. In one embodiment, the cutting insert 38 provides a negative rake angle when mounted to the insert-receiving pocket 36. It will be appreciated that the invention is not limited by the shape of the cutting insert, and that the invention can be practiced with other desirable insert shapes, such as square, rectangular, triangular, and the like.

Referring now to FIG. 1, the four different radial distances d1, d2, d3 and d4 from the central, longitudinal axis 18 at which the back wall 14d of the cartridge-receiving pockets 14 in each group are formed, and the four different axial distances a1, a2, a3 and a4 at which the bottom wall 14c of the cartridge-receiving pockets 14 in each group are formed with respect to the end face 22a of the body positions the cutting edge of each cutting insert 38 at a predetermined radial and axial location with respect to the central, longitudinal axis 18 of the body 12 when the insert-receiving cartridge 30 is mounted in the cartridge-receiving pocket 14.

Specifically, the cutting edge 42 of the cutting inserts 38 mounted to two opposite cartridge-receiving pockets 14 at the axial distance a1 and the radial distance d1 in the first and second groups has the largest radial distance r1 from each other for performing finish machining of the workpiece (not shown). The cutting edge 42 of the cutting inserts 38 mounted to two opposite cartridge-receiving pockets 14 at the axial distance a2 and the radial distance d2 in the first and second groups has the second largest radial distance r2 from each other for performing semi-finish machining of the workpiece. The cutting edge 42 of the cutting inserts 38 mounted to two opposite cartridge-receiving pockets 14 at the axial distance a3 and the radial distance d3 in the first and second groups has the third largest radial distance r3 from each other for performing semi-rough cutting of the workpiece. The cutting edge 42 of the cutting inserts 38 mounted to two opposite cartridge-receiving pockets 14 at the axial distance a4 and the radial distance d4 in the first and second groups has the smallest radial distance r4 from each other for performing rough machining of the workpiece. As a result, the cutting tool 10 of the illustrated embodiment of the invention provides for two cutting edges 42 for performing finish machining, two cutting edges 42 for performing semi-finish machining, two cutting edges 42 for performing semi-rough machining, and two cutting edges 42 for performing rough machining.

In operation, the cutting tool 10 is moved relative to a workpiece (not shown). For example, the cutting tool 10 may move linearly along a central axis of the workpiece as the workpiece rotates, or the cutting tool 10 may rotate about the central, longitudinal axis 18 as the workpiece moves linearly along its central axis. In one embodiment, the cutting tool 10 comprises a boring bar and the workpiece comprises a railroad wheel. During the different machining operations, the workpiece presents a plurality of different surface conditions. One surface condition is a pre-machined surface prior to the commencement of any machining operation thereon. Other surface conditions include, but are not limited to, a roughened surface, a semi-roughened surface, a semi-finished surface, and a finished surface.

In the illustrated embodiment in the cutting tool 10 with eight cutting inserts 28 (two groups with four cutting inserts in each group), the first cutting insert to engage the surface of the workpiece is the cutting insert 38 mounted in the cartridge-receiving pocket 14 at the axial distance a4 and the radial distance d4 to perform the roughing machining of the workpiece. This cutting insert 38 removes material from the workpiece to a first specific depth based on the axial distance a4, which also results in that portion of the workpiece having the roughened surface with a specified surface roughness.

The next cutting insert 38 to engage the surface of the workpiece is the cutting insert 38 mounted in the cartridge-receiving pocket 14 at the axial distance a3 and the radial distance d3 and performs the semi-roughing machining of the workpiece. This cutting insert 38 removes material from the workpiece to a second specific depth based on the axial distance a3, which also results in that portion of the workpiece having the semi-roughened surface with a specified surface roughness.

The next cutting insert 38 to engage the surface of the workpiece is the cutting insert 38 mounted in the cartridge-receiving pocket 14 at the axial distance a2 and the radial distance d2 and performs the semi-finishing machining of the workpiece. This cutting insert 38 removes material from the workpiece to a third specific depth based on the axial distance a2, which also results in that portion of the workpiece having the semi-finished surface with a specified surface roughness.

The last cutting insert 38 to engage the surface of the workpiece is the cutting insert 38 mounted in the cartridge-receiving pocket 14 at the axial distance a1 and the radial distance d1 and performs the finishing machining of the workpiece. This cutting insert 38 removes material from the workpiece to a fourth specific depth based on the axial distance a1, which also results in that portion of the workpiece having the finished surface. The four cutting inserts 38 in the second group then engage the workpiece to produce a finished product that has a specified surface roughness and dimension.

Tests of the cutting tool 10 were conducted, and the cutting tool 10 provided unexpected results. Specifically, the cutting tool 10 using eight cutting inserts performed at faster feed rates and cut with less force as compared to a conventional cutting tool using four cutting inserts. In addition, the cutting tool 10 using eight cutting inserts demonstrated improved chip control and evacuation as compared to the convention cutting tool using four cutting inserts. Further, the life expectancy of the cutting inserts 38 of the cutting tool 10 was over ten times the life expectancy of cutting inserts used in a conventional cutting tool, such as a conventional boring bar with only four cutting inserts (two roughing and two finishing).

It will be appreciated that the principles of the invention can be applied to a cutting tool having a different number of insert-receiving cartridges. For example, the principles of the invention can be practiced with a cutting tool using a total of six insert-receiving cartridges, or more than eight insert-receiving cartridges.

It will also be appreciated that the cutting tool of the invention, in addition to the boring bar shown in FIG. 1, may also be a drill or turning tool.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A multi-cartridge cutting tool, comprising:
a body including at least four cartridge-receiving pockets, each cartridge-receiving pocket including a pair of side walls, a bottom wall and a back wall;
an insert-receiving cartridge adapted to be mounted to each cartridge-receiving pocket; and
a cutting insert adapted to be mounted to a respective insert-receiving cartridge, a first group of cutting inserts comprises one-half of the cutting inserts adjacent to each other, and a second group of cutting inserts comprises the other one-half of the cutting inserts, wherein each cutting insert in the first group is located diagonally opposite to a cutting insert in the second group;
wherein cutting edges of the cutting inserts in the first group are each located at different axial and radial distances from a central, longitudinal axis of the body and the cutting edges of the cutting inserts in the second group are located at different axial and radial distances from the central, longitudinal axis of the body, and
wherein a cutting edge of at least one of the cutting inserts of the first group is located at the same axial distance as a cutting edge of at least one of the cutting inserts of the second group.

2. A cutting tool according to claim 1, wherein the body includes an even number of cartridge-receiving pockets that are located circumferentially equidistant about an outer surface of the body.

3. A cutting tool according to claim 1, wherein the body further includes a flute adjacent each of the cartridge-receiving pockets.

4. A cutting tool according to claim 3, wherein the flute has a concave profile that is substantially parallel to the central, longitudinal axis of the body.

5. A cutting tool according to claim 1, wherein the insert-receiving cartridge includes a pair of apertures adapted to receive a mounting screw for mounting the insert-receiving cartridge to its respective cartridge-receiving pocket.

6. A cutting tool according to claim 1, wherein the body further includes a flange member having an end face.

7. A cutting tool according to claim 6, wherein the bottom wall of the cartridge-receiving pockets is located at four different axial distances with respect to the end face of the flange member.

8. A cutting tool according to claim 1, wherein the back wall of the cartridge-receiving pockets is located at four different radial distances with respect to the central, longitudinal axis of the body.

9. A cutting tool according to claim 1, wherein the cutting insert comprises a round cutting insert.

10. A multi-cartridge cutting tool, comprising:
   a body including eight cartridge-receiving pockets, each cartridge-receiving pocket including a pair of side walls, a bottom wall and a back wall;
   an insert-receiving cartridge adapted to be mounted to a respective cartridge-receiving pocket; and
   a cutting insert adapted to be mounted to a respective insert-receiving cartridge,
   wherein cutting edges of four adjacent cutting inserts are located at four different axial distances and four different radial distances from a central, longitudinal axis of the body to perform finish machining, semi-rough machining and rough machining of a workpiece, and
   wherein a cutting edge of at least one of the remaining cutting inserts is located at the same axial distance as a cutting edge of one of the four adjacent cutting inserts.

11. A cutting tool according to claim 10, wherein the eight cartridge-receiving pockets are located circumferentially equidistant about an outer surface of the body.

12. A cutting tool according to claim 10, wherein the body further includes a flute adjacent each of the eight cartridge-receiving pockets.

13. A cutting tool according to claim 12, wherein the flute has a concave profile that is substantially parallel to the central, longitudinal axis of the body.

14. A cutting tool according to claim 10, wherein the insert-receiving cartridge includes a pair of apertures adapted to receive a mounting screw for mounting the insert-receiving cartridge to its respective cartridge-receiving pocket.

15. A cutting tool according to claim 10, wherein the body further includes a flange member having an end face.

16. A cutting tool according to claim 15, wherein the bottom wall of the cartridge-receiving pockets is located at four different axial distances with respect to the end face of the flange member.

17. A cutting tool according to claim 10, wherein the back wall of the cartridge-receiving pockets is located at four different radial distances with respect to the central, longitudinal axis of the body.

18. A cutting tool insert according to claim 10, wherein the cutting insert comprises a round cutting insert.

* * * * *